United States Patent [19]
Tilman et al.

[11] Patent Number: 4,822,539
[45] Date of Patent: Apr. 18, 1989

[54] METHOD OF AND APPARATUS FOR EXTRUDING BAG MAKING MATERIAL HAVING FASTENER PROFILES AND ALIGNMENT RIBS, WITH REINFORCING AND STABILIZING BEAM EFFECT RIDGE MEANS

[75] Inventors: Paul A. Tilman, New City; Zdenek Machacek, Nanuet; Richmond Scott, Pleasantville, all of N.Y.

[73] Assignee: Minigrip, Inc., Orangeburg, N.Y.

[21] Appl. No.: 95,835

[22] Filed: Sep. 14, 1987

[51] Int. Cl.[4] .................. B29C 47/06; B29C 47/30; B29C 47/92

[52] U.S. Cl. .................... 264/40.4; 156/66; 156/244.15; 156/244.25; 156/500; 264/40.7; 264/173; 264/177.14; 264/209.8; 425/133.5; 425/140; 425/146; 425/463

[58] Field of Search .......... 264/40.7, 173, 177.1, 264/177.14, 177.17, 209.1, 209.8, 40.4; 425/131.1, 133.5, 146, 463, 464, 140; 156/66, 244.13, 244.15, 244.25, 500

[56] References Cited

U.S. PATENT DOCUMENTS

| Re. 27,174 | 9/1971 | Ausnit . | |
|---|---|---|---|
| 3,198,228 | 8/1965 | Naito | 156/244.15 X |
| 3,543,343 | 12/1970 | Staller et al. | 425/326.1 X |
| 3,565,737 | 2/1971 | Lefevre et al. | 425/133.5 X |
| 3,715,420 | 2/1973 | Kiyono et al. | 264/171 |
| 3,841,816 | 10/1974 | Herz . | |
| 4,125,585 | 11/1978 | Rosenbaum | 264/173 |
| 4,263,079 | 4/1981 | Sutrina et al. | 156/66 X |
| 4,562,027 | 12/1985 | Behr et al. | 264/177.17 X |
| 4,563,319 | 1/1986 | Ausnit et al. | 156/66 X |
| 4,672,723 | 6/1987 | Hugues et al. | 24/587 |
| 4,741,789 | 5/1988 | Zieke et al. | 156/66 |

FOREIGN PATENT DOCUMENTS

| 114373 | 8/1984 | European Pat. Off. . | |
| 1444326 | 7/1976 | United Kingdom | 156/244.25 |
| 2046660 | 11/1980 | United Kingdom . | |

Primary Examiner—Jeffery Thurlow
Assistant Examiner—Leo B. Tentoni
Attorney, Agent, or Firm—Hill, Van Santen, Steadman & Simpson

[57] ABSTRACT

A method of and apparatus for controlled coextrusion of plastic bag making film and a reclosable fastener male profile comprising extruding the film through an orifice with which is aligned a profile orifice and one or more alignment rib orifices as well as one or more stablizing ridge orifice cooperating with the profile and/or rib orifices. The resulting extruded product provides a bag making material comprising a plastic film carrying the zipper profile and with one or more alignment ribs in spaced parallel relation to the profile, with a reinforcing ridge or ridges effecting stabilizing beam effect in respect to the alignment rib or ribs and/or the profile during the processing of the extruded product into its final bag making material form. The extrudate for the film and the extrudate for the alignment rib or ribs may be derived from separate sources so that different plastics of different density or characteristics may be supplied to the alignment rib or ribs. The plastic for the alignment rib or ribs and the stabilizing ridge or ridges may be derived from a common source. Controls are provided for independently controlling extrudate volume for the profile, the alignment rib or ribs, and the stabilizing ridge or ridges.

39 Claims, 3 Drawing Sheets

METHOD OF AND APPARATUS FOR EXTRUDING BAG MAKING MATERIAL HAVING FASTENER PROFILES AND ALIGNMENT RIBS, WITH REINFORCING AND STABILIZING BEAM EFFECT RIDGE MEANSure

BACKGROUND OF THE INVENTION

The present invention relates to the extruded reclosable bag making art, and is more particularly concerned with a new and improved method and apparatus for extruding bag making material having fastener profiles and alignment ribs, and the product made thereby.

Heretofore it has been proposed to provide in association with the male profile of extruded plastic zipper, so called supporting rails, as exemplified in U.S. Pat. No. 3,198,228 for assisting in the function of the zipper. To similar effect European Patent Application No. 0 114 373, published Aug. 1, 1984, provide ribs in association with the plastic zipper male profile to afford controlled desired stiffening and wise-track feel in the fastener element.

In the pending U.S. application of Hugues and Ausnit, Ser. No. 866,917, filed May 27, 1986, now U.S. Pat. No. 4,672,723 issued June 16, 1987 and assigned to the same assignee as the present application, ribs have been provided in spaced adjacent relation to the male profile, not only for providing stiffening and wide-track feel in the male profile, but also for effectively guiding the male and female profiles into interlocked relation when pressing them together. It is to effect certain improvements in the method and apparatus for producing the male zipper profile and associated ribs, and the resulting product, that the present invention is directed, as will be apparent in the following description.

Attention is also directed to U.S. Pat. No. Re. 27,174, which discloses providing extruded reclosable bags with rib and groove elements formed of different materials, that is extruded plastic material having desired different characteristics such as differential stiffness relative to the plastic sheet or film material.

Further of general interest is U.K. patent application No. GB 2 046 660 A, published Nov. 19, 1980, and which relates to the extrusion of plastic closure strip separate from the plastic film, but with the profile and the base of the profile extruded through separately controlled channels to union of the profile and base of the profiles at a common extrusion die orifice. It is indicated that different plastic material can be used for the profile and base portions.

U.S. Pat. No. 3,841,816 discloses an apparatus for extruding tubing for fastener bags and wherein means are provided for controlling the profiles with respect to the extruded tube.

SUMMARY OF THE PRESENT INVENTION

An important object of the present invention is to provide new and improved method of and apparatus for producing extruded bag making material with zipper profiles and wherein the male profile has associated therewith alignment ridges which are controlled to substantially maintain their lateral positions relative to the profile in spite of film gauge differentials, and film tube diameter differentials for producing bag making material of different widths.

Another object of the invention is to provide a new and improved method and apparatus for controlled extrusion of a bag making material as aforesaid and facilitating dissimilar materials and/or colors in the alignment ribs for various degrees of rigidity and coloration.

A further object of the invention is to provide a new and improved method of and apparatus for controlling position of alignment ridges relative to extruded zipper profiles on extruded bag making film by coextruded application of extrudate in a selected base area of the profile.

Still another object of the invention is to provide a new and improved method of and apparatus for controlling the relative rigidity of extruded male and alignment ridges by controlled coextrusion.

A yet further object of the invention is to provide a new and improved method of and apparatus for effectively maintaining alignment ribs in close spaced adjacency to the male profile in extruded plastic bag making material having reclosable fastener or zipper profiles in which the alignment ribs facilitate interlocking assembly of the profiles.

Yet another object of the invention is to provide new and improved extruded bag making material having a novel construction of male profile and associated alignment ribs in a stabilized relation to the male profile.

In accordance with the principles of the present invention, there is provided a method of controlled coextrusion of plastic bag making film and zipper profile, comprising extruding plastic extrudate in predetermined volume into a film; extruding plastic extrudate into a zipper profile and directing the freshly extruded profile into union with the freshly extruded film; controlling the volume of extrudate to the extruded profile and controlling the size of the profile relative to the film; extruding a plastic extrudate into at least one alignment rib and joining the freshly extruded rib with the freshly extruded film in adjacent spaced parallel relation to said profile; and controlling the volume of extrudate in the rib relative to the volume of extrudate in the film and the volume of extrudate in the profile.

The present invention also provides new and improved apparatus for practicing the invention.

New and improved extruded plastic bag making material is provided by the present invention, wherein alignment ribs associated with a male zipper profile are stabilized in a unique manner with respect to their spacing from the male profile.

BRIEF DESCRIPTION OF THE DRAWINGS

Other objects, features and advantages of the present invention will be readily apparent from the following description of representative embodiments thereof, taken in conjunction with the accompanying drawings, although variations and modifications may be effected without departing from the spirit and scope of the novel concepts embodied in the disclosure and in which.

DETAILED DESCRIPTION

Figure 1:
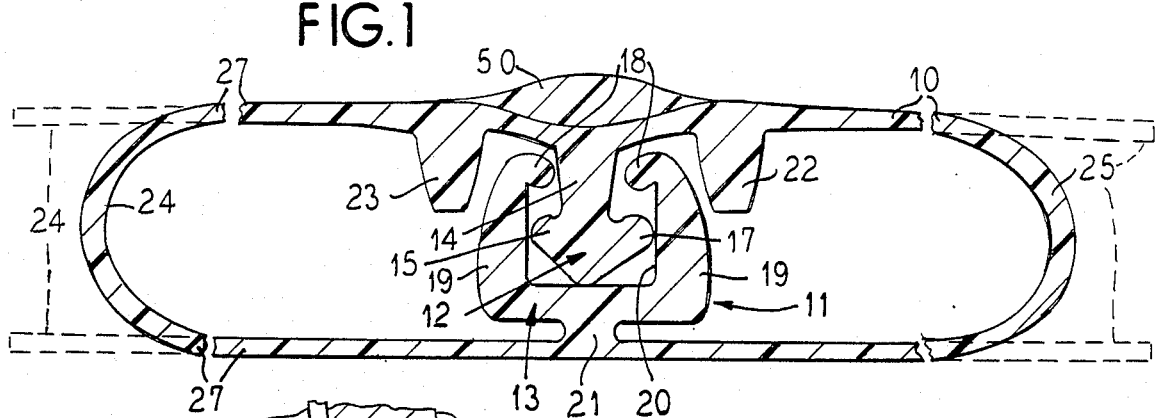
FIG. 1 is an enlarged fragmentary cross sectional detail view of bag making material embodying the present invention.
Figure 5:
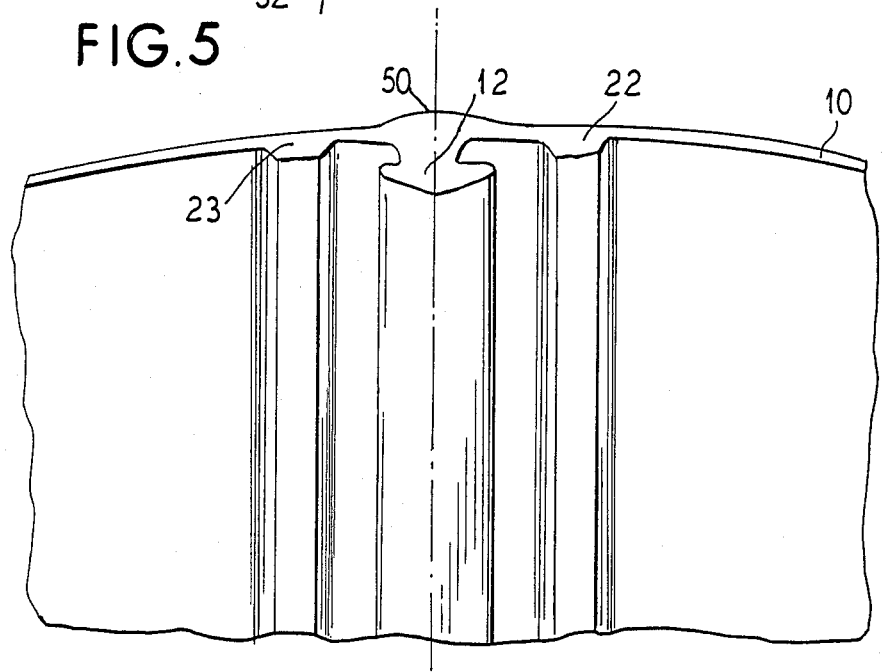
FIG. 5 is a fragmentary sectional elevational detail view of bag making material as extruded in tubular form and before it is collapsed as demonstrated in FIG. 1.

Referring to FIGS. 1 and 5, extruded bag making material embodying the present invention comprises bag wall film 10 which may conveniently be extruded tubularly as exemplified in FIG. 5 and then collapsed as shown in FIG. 1 for interlocking a reclosable fastener or zipper 11 which includes a male profile 12 and a complementary female profile 13 so located on the inside of the tubular extrusion that when the extrusion is collapsed, the profiles will interlock as shown in FIG. 1. The male profile 12 has a stem 14 integral at its base with the film 10 and provided with a generally arrow-shaped head having opposite shoulder lobes 15 and 17 interlockable with respective overhanging shoulders 18 on respective arms 19 of the female profile 13 when the male profile 12 is pressed into a groove 20 in the female profile. At its base 21, the female profile is integrally attached to the film 10.

For not only stiffening the area of the film 10 occupied by the male profile 12, but also for facilitating alignment of the profiles 12 and 13 for press-together interlocking, at least one alignment rib 22 is located integral with the film 10 in spaced parallel adjacent relation to the inner side of the male profile 12 having regard to the eventual bag into which the collapsed extrusion will be converted. For increasing the force, which may tend to open the zipper 11 from the inside of the bag, the shoulder lobe 17 at the inner side of the male profile is larger than the shoulder lobe 15. As will be observed, the spacing between the rib 22 and the lobe 17 is sufficient to permit passage of the shoulder bead 18 of the associated arm 19 of the female profile 13 when the profiles are pushed together. However, such spacing is close enough to assure efficient alignment of the elements during the zipper closing maneuver. Desirably, a second alignment rib 23, substantially like the alignment rib 22, is located integrally on the film 10 in spaced adjacent parallel relation at the opposite or outer side of the profile 12.

In the collapsed condition of the bag making extrusion, a top end closure fold 24 and a bottom end closure fold 25 appear. Either of the folds 24 or 25 may be slit longitudinally and spread open as shown in phantom outline for bag filling purposes. Where the bottom fold is slit open, it may be resealed for closing the bag after filling. Similarly, if the bag is to be filled from the top, the top fold may be slit open and after filling the bag the slit ends may be resealed if desired. When the bag is to be opened for discharge of contents, the top fold 24, where it has not been previously slit open, or even where the top end has been resealed, and then slit open, the slit end portions become extensions of bag opening pull flanges 27.

In a preferred construction, the alignment ribs 22 and 23 are of a relatively blocky, more or less square, form with generally rounded tip edges, thereby providing improved stiffness in the alignment ribs 22 and 23 for the intended purpose.

Figure 2:
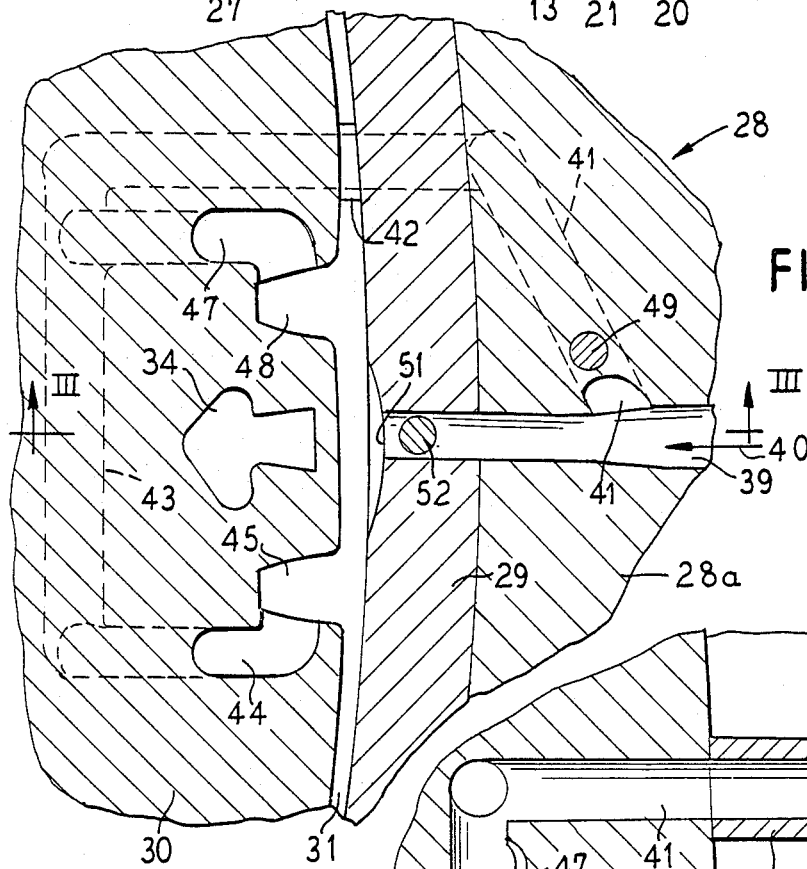
FIG. 2 is a enlarged fragmentary plan sectional detail view taken substantially along the line II—II in FIG. 3 and showing apparatus embodying the present invention.
Figure 4:
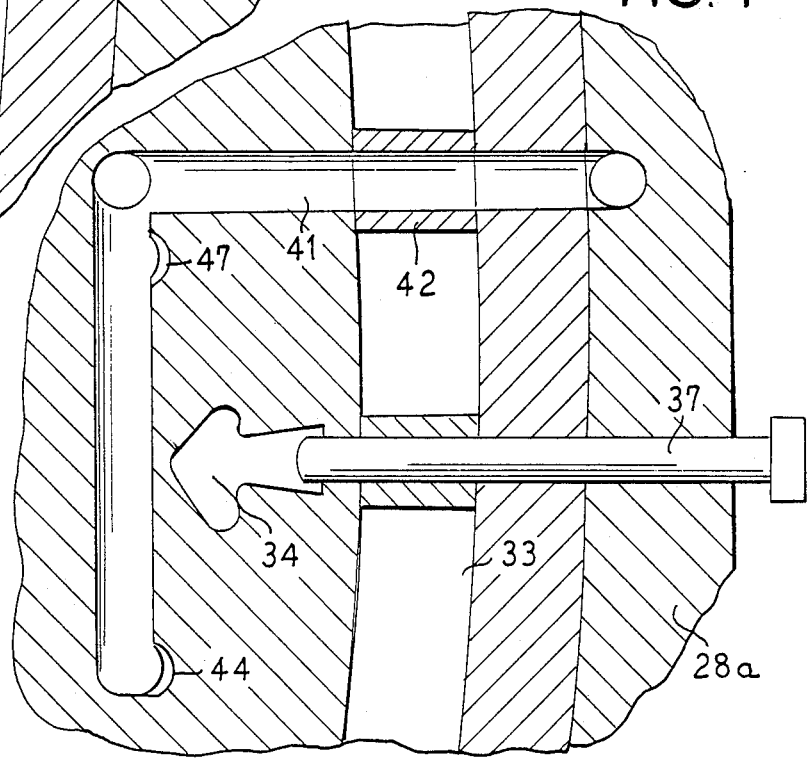
FIG. 4 is a fragmentary sectional detail view taken substantially along the line IV—IV in FIG. 3.
Figure 3:
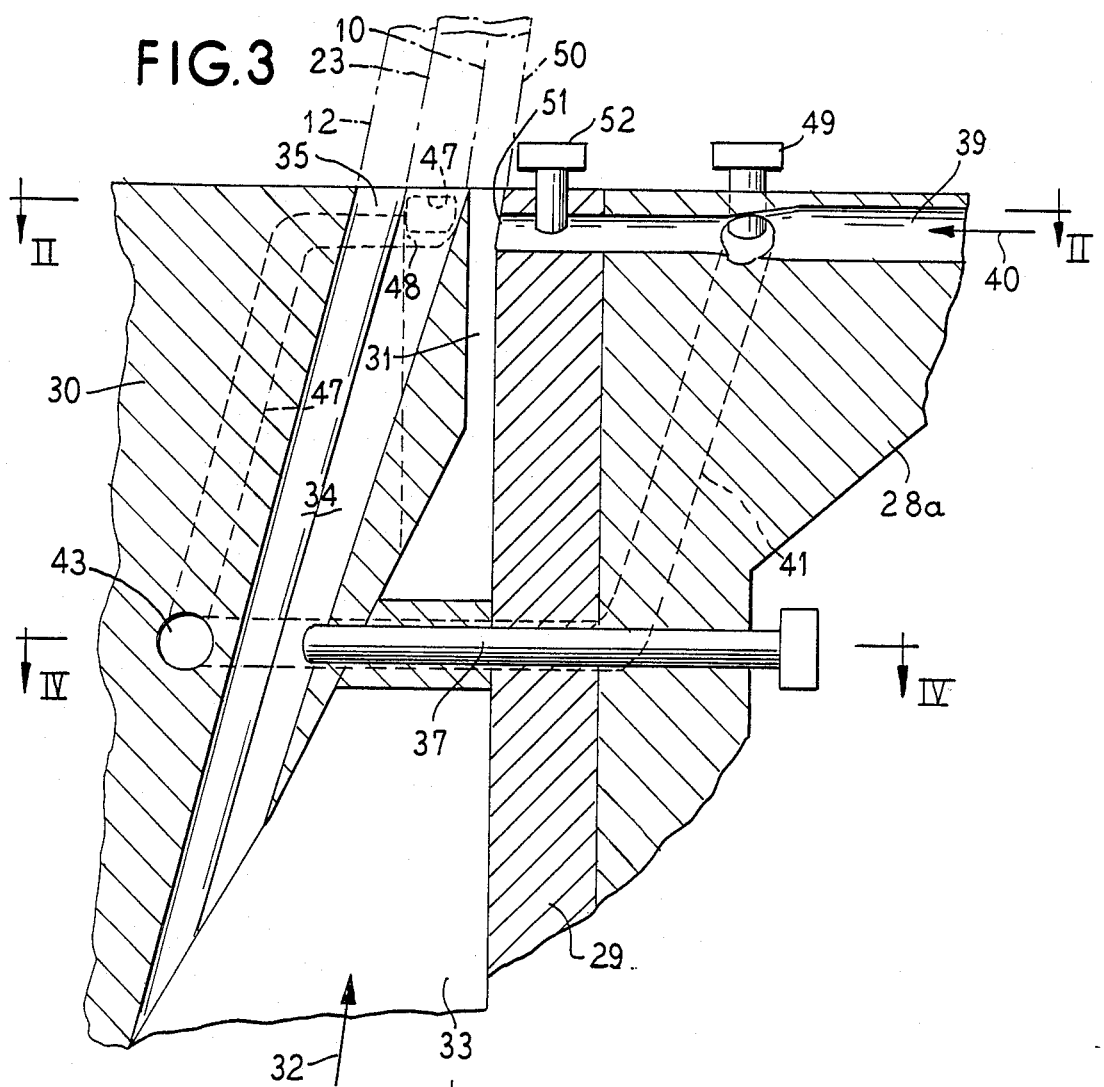
FIG. 3 is a fragmentary vertical sectional detail view taken substantially along the line III—III in FIG. 2.

In order to assure attainment of the desired blocky section of the alignment ribs 22 and 23, as well as to prevent migration of the ribs 22 and 23 away from the male profile 12, means are desirably provided for separately coextruding the ribs with the film 10 as depicted in FIGS. 2–4. For this purpose, extrusion apparatus 28 comprises a die housing 28a within which is an outer die or sizing ring 29. Within the inner diameter of the ring 29 is an inner die core or ring 30 which cooperates to define a tubular film extrusion orifice 31 to which is fed under pressure, indicated by the arrow 32 in FIG. 3, thermoplastic materials such as polyethylene, or the like extrudate, forced from a supply chamber 33 to the orifice 31. Extrudate from the chamber 33 also flows through a male profile flow channel 34 to a profile orifice 35 which connects with the film orifice 31 and by coextrusion joins the base of the just formed male profile 12 to the just formed fresh film 10 just before they issue from the respective orifices. For properly controlling the volume of the extrudate flowing through the profile channel 34, there is provided a control choke valve 37 arranged to be manipulated from outside the extrusion die assembly which is contained within the housing 28a.

Formation of the alignment ribs 22 and 23 is desirably effected by coextrusion means cooperatively related to the extrusion means for the film and the male profile. For this purpose, an extrudate channel 39 leads from a source under pressure, as represented by the arrow 40 (FIGS. 2 and 3), through and into the housing 28a to a branch channel 41 that extends on through the die ring 29 and a spider 42 bridging the chamber 33 and then joins a header 43 in the inner die member 30. From the header 43 a branch channel 44 leads extrudate to an extrusion orifice 45 for forming the alignment rib 22 in a coextruding relation to the orifice 31 so that the rib 22 and the film 10 are coextruded. To the same effect, a rib extrudate channel 47 leads from the header 43 to a coextrusion orifice 48 for the alignment rib 23 at the film orifice 31. For controlling the volume of the extrudate for the alignment ribs relative to the volume of the extrudate for the film and the zipper profile, a choke valve 49 controls the channel 41.

It will be understood that, as is customary practice, as the tubular film 10 leaves the extrusion orifice 31, the tube is expanded or reduced as by air pressure to a desired diameter for producing when collapsed a bag making material of desired width. Desirably different tubular diameters may be produced from the same extrusion die. For example, the extrusion assembly 28 may, when desired, extrude a tube which when flattened will result in a fifteen inch width so that bags fifteen inches deep will result when the bag making material length is separated into bag sections. For a fifteen inch width, the film gauge could be about 0.002 inch. On the other hand, the same die assembly 28 could be utilized to produce a bag material width of seventeen inches wherein the film gauge could be the same or about 0.004 inch. The difference in film gauge between the fifteen inch and seventeen inch width material may be easily attained by controlling the extrudate volume to the orifice 31 in conjunction with blow up ratio and draw away rate to obtain the desired result. As will be apparent, extrudate to the profile forming channel 34 and the rib forming channel 41 is adapted to be controlled concurrently by means of the respective valves 37 and 49 concurrently with the desired extrudate volume to the orifice 31.

A problem that must be met under all circumstances but especially where different diameters of film tube are to be produced is that of maintaining a proper relation of the alignment ribs 22 and 23 to the male profile 12. During the extrusion of the tube, there is a tendency for the ribs 22 and 23 to migrate from the associated profile 12. This tendency is accentuated when the film 10 is stretched. There is also a tendency for the shape of the ribs 22 and 23 to distort from the desired cross section. Both of these problems are alleviated by separate coextrusion of the alignment ribs, thereby assuring that the desired volume of rib extrudate is present by virtue of the separate rib extrusion orifices 45 and 48. Furthermore, in order to reduce the effect of the migration of the ribs 22 and 23 away from the male profile 12, it is desirable to place the ribs as close as possible to said profile. To successfully do this an retain the blocky shape of the ribs, it is necessary to separately control the flow of extrudate to the ribs. Otherwise, the ribs have to be made too large and will flow into the profile, or if made too small, will not provide the necessary size for satisfactory performance. In addition, the ribs will draw melt away from the male profiles causing instability, loss of shape and loss of pressure. Finally, if the gauge of the film is changed, the above problem is further compounded. In addition, other means are also provided to substantially avoid migration of the alignment ribs. To this end, a generally flattened stabilizing ridge 50 is formed in the back of the base of the profile 12 in a manner to taper at each side toward the adjacent side of the respective rib 22 or 23. In other words, the ridge 50 is of a controlled greater thickness behind the profile 12 and then tapers to progressively thinner section toward the adjacent sides of the alignment ribs. This provides a reinforcement beam effect which stabilizes and helps substantially to avoid separating migration of the alignment ribs relative to the associated profile irrespective of the tendency of the ribs to migrate away from the profile, which tendency is accelerated when the diameter of the tubular film is expanded upon extrusion. For this purpose, the coextrusion channel 39, from which channel 41 branches, leads to and discharges the stabilizing ridge 50 at an orifice 51 which joins the ridge 50 to the freshly extruded film 10 at this orifice. Control of the volume of the extrudate in the ridge 50 relative to the volume in the film 10, the profile 12 and the ribs 22 and 23 is effected by means of a choke valve 52 in the downstream end portion of the channel 39 adjacent to the stabilizing ridge orifice 51.

Figure 6:
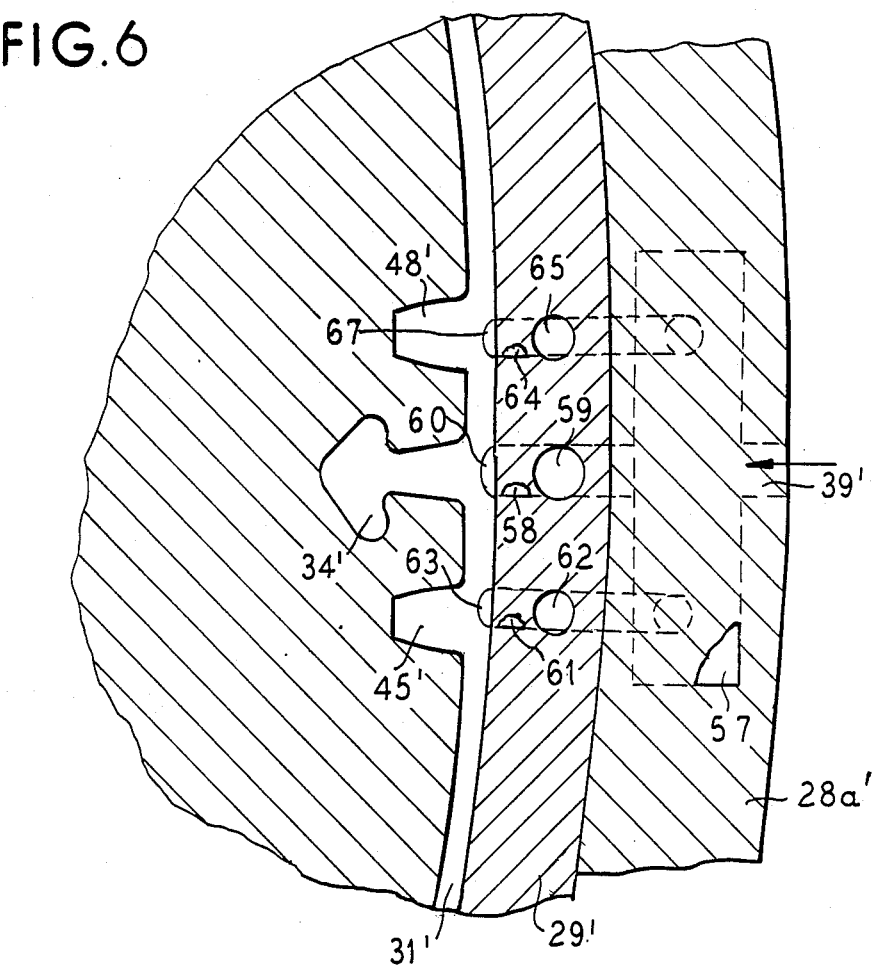
FIG. 6 is a view similar to FIG. 2, but showing a modification.
Figure 7:
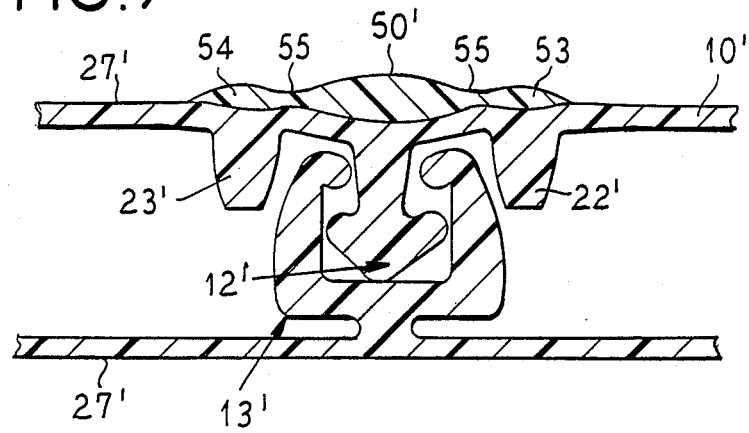
FIG. 7 is a fragmentary enlarged cross sectional detail view similar to FIG. 1, but showing the results of extrusion involving the apparatus of FIG. 6.

As shown in FIGS. 6 and 7, the extrusion die apparatus 28' and the bag wall film 10' are generally the same as described in connection with the apparatus 28 and the bag wall film 10 in FIGS. 1-5, and it will be understood that similar description applies to all of the elements identified by primed reference numerals in FIGS. 6 and 7 and that various elements and structural relationships involved in the extrusion process and product in FIGS. 1-5 are also applicable to the modification of FIGS. 6 and 7. The principal difference in FIGS. 6 and 7 is that in addition to the ridge beam 50' along the base of the fastener profile 12', there is provided a ridge beam 53 along the base of the rib 22' and a ridge beam 54 along the base of the rib 23'. The ridge beams 53 and 54 cooperate with the ridge beam 50' in a cooperative rib stabilizing fashion, and the side edges of the ridge beam 50' may, as shown, blend into the ridge beams 53 and 54 in a manner to increase the retention of the ribs 22' and 23' against migrating relative to the profile 12' while nevertheless permitting reasonable hinging action when necessary at junctures 55 along the continguous sides of the ridge beams.

Although each of the ridge beams 50', 53 and 54 may be formed by extrudate delivered thereto individually from any desirable source, the arrangement depicted schematically in FIGS. 6 and 7 shows that a common source delivers extrudate through a channel 39' to manifold chamber 57 from which it is delivered through a branch channel 58 under the control of a choke valve 59 to an orifice 60 for forming the stabilizing ridge beam 50' at the freshly extruded film 10' along the base of the profile 12' being shaped in the extrusion orifice 34'. Similarly, extrudate is delivered from the manifold 57 through a channel 61 under the control of a choke valve 62 to an orifice 63 for forming the stabilizing ridge beam 53 at the film 10' being formed in the film orifice 31' along the base of the rib 22' undergoing formation in the rib extrusion orifice 45'. Also, a channel 64 delivers the plastic extrudate from the manifold 57 under the control of a choke valve 65 to a ridge beam forming orifice 67 along the film 10' forming in the orifice 31' along the base of the rib 23' being formed in the rib extrusion orifice 48'.

From the foregoing, it will be apparent that by separately feeding the extrudate to the alignment ribs and incorporating a choke control, the alignment rib sizes respective to film gauge changes can be easily controlled and their migration away from the male profile at least partially prevented. Further, independent feed of the extrudate to the alignment ribs permits use of dissimilar extrudate materials either as to density and stiffness which further helps prevent the migration of the ribs from the profile, or to provide extrudate of different colors, or both, whereby to afford various degrees of rigidity and/or colors where desired. By pressurizing the base of the male profile via the coextruder and forming the stabilizing ridge or beam, migration of the alignment ribs away from the male profile is yet more efficiently restrained, so that it is possible to produce bag making material of a number of different widths from the same die while retaining the alignment ribs substantially against moving away from the associated profile. As pressure is increased from the coextruder at the stabilizing ridge beam, control over migration of the alignment ribs relative to the associated profile is attained in a manner not heretofor available. By use of extrudate polymers of dissimilar melt extension characteristics which provide greater stiffness in the alignment ribs and the stabilizing ridge beam than the extruded film, further control against alignment rib migration can be attained. The back of the ribs as well as the back of the associated profile may be advantageously provided with the ridge beams.

It will be understood that variations and modifications may be effected without departing from the spirit and scope of the novel concepts of the present invention.

We claim as our invention:

1. A method of controlled coextrusion of plastic bag making film with a male zipper profile thereon and an adjacent alignment rib, comprising:

extruding plastic extrudate in predetermined volume into a film;

extruding plastic extrudate into a male zipper profile and joining the freshly extruded profile into union with the freshly extruded film;

extruding a separate plastic extrudate into at least one alignment rib and joining the freshly extruded rib with the freshly extruded film in adjacent spaced parallel relation to said male profile;

controlling the volume of said separate extrudate in the rib relative to the volume of extrudate in the film; and extruding a reinforcing ridge and joining said ridge to the opposite side of the film from that to which said profile is joined and along and in alignment with the back of the base of said male profile.

2. A method according to claim 1, which comprises controlling the volume of extrudate to the extruded profile and controlling the size of the male profile relative to the film.

3. A method according to claim 1, which comprises supplying the extrudate for extruding said film from a pressure chamber, and supplying profile extrudate through a channel leading from the same pressure chamber.

4. A method according to claim 3, which comprises supplying the extrudate for extruding said alignment rib from a channel separate from said chamber.

5. A method according to claim 1, which comprises supplying the extrudate for said alignment rib through a channel, and effecting said control of the extrudate for said rib by operating a choke valve in said channel.

6. A method according to claim 1, including extruding plastic extrudate into a second alignment rib in adjacent spaced parallel relation to the opposite side of said male profile from said at least one alignment rib.

7. A method according to claim 6, which comprises supplying said extrudate for said alignment ribs from a common manifold.

8. A method according to claim 6, which comprises extruding said film through a film forming orifice, and extruding said alignment ribs through respective alignment rib forming orifices aligned with said film forming orifice.

9. A method according to claim 1, which comprises supplying the extrudate for said profile and said alignment rib from different source than the extrudate for said film, so that plastics of different characteristics may be supplied for respectively the film and male profile and the alignment rib.

10. A method according to claim 1 comprising feeding from a common source extrudate for both said rib and said ridge.

11. A method according to claim 10, wherein controlling the extrudate to said ridge is effected by operating a choke valve in said channel.

12. A method according to claim 1, which includes also providing a reinforcing ridge along the back of said alignment rib.

13. A method of controlled coextrusion of plastic bag making film with a male zipper profile thereon and an adjacent alignment rib, comprising:

extruding plastic extrudate into a film;

extruding plastic extrudate into a male zipper profile having a base and joining the freshly extruded profile into union with the freshly extruded film;

extruding plastic extrudate into at least one alignment rib, and joining a base of said freshly extruded rib with the freshly extruded film in adjacent spaced parallel relation to said male profile;

providing a separately extruded stabilizing beam effect ridge along and in alignment with the back of said male profile based and on the opposite side of the film from the side to which said profile base is joined; and forming said ridge of greater longitudinally central thickness than opposite sides of said ridge.

14. A method according to claim 13, which comprises also providing a stabilizing ridge along said base of said rib, and blending the side of said rib-stabilizing ridge with the adjacent side of said beam effect ridge.

15. A method according to claim 13, which comprises providing another alignment rib with a base joined to said web parallel to said male profile on the opposite side of said male profile from said first mentioned rib, and providing a similar stabilizing ridge along the base of each of said ribs.

16. Apparatus for controlled coextrusion of plastic bag making film and zipper profile wherein an interlocking male zipper profile includes an adjacent alignment rib, comprising:

means for extruding plastic extrudate in predetermined volume into a film;

means for extruding plastic extrudate into a male zipper profile and directing the freshly extruded profile into union with the freshly extruded film;

means for extruding a separate plastic extrudate into at least one alignment rib and joining the freshly extruded rib with the freshly extruded film in adjacent spaced parallel relation to said male profile;

means for controlling the volume of said separate extrudate in the rib relative to the volume of extrudate in the film; and a means for extruding a reinforcing ridge and for joining said ridge to the opposite side of the film from that to which said profile is joined and along and in alignment with the back of the base of said male profile.

17. Apparatus according to claim 16, which includes means for supplying the extrudate for extruding said film from a pressure chamber and for supplying a male profile extrudate channel from the same pressure chamber.

18. Apparatus according to claim 17, which includes means for supplying the extrudate for extruding said alignment rib from a channel separate from said chamber.

19. Apparatus according to claim 16, including means for controlling the volume of extrudate to the extruded male profile and for controlling the size of the profile relative to the film.

20. Apparatus according to claim 16, which includes means for supplying the extrudate for said alignment rib through a channel, and a choke valve in said channel for effecting said control of the extrudate for said rib.

21. Apparatus according to claim 16, including means for extruding plastic extrudate into a second alignment rib in adjacent spaced parallel relation to the opposite side of said male profile from said at least one alignment rib.

22. Apparatus according to claim 21, which includes means for supplying said extrudate for said alignment ribs from a common manifold.

23. Apparatus according to claim 21, which includes a film forming orifice for extruding said film, and respective alignment rib forming orifices aligned with said film forming orifice for extruding said alignment ribs.

24. Apparatus according to claim 16, which includes means for supplying the extrudate for said alignment rib from a different source than the extrudate for said film, so that plastics of different characteristics may be supplied for respectively the film and the alignment rib.

25. Apparatus according to claim 16, including means for feeding extrudate for said rib and said ridge from a common source.

26. Apparatus according to claim 25, including a choke valve in said channel for controlling the extrudate to said ridge.

27. Apparatus according to claim 16, including means for forming a reinforcing ridge along the base of said alignment rib on the opposite side of said film from that to which said rib is joined.

28. Apparatus according to claim 27, wherein said means for extruding and forming said film, profile, ribs and ridges comprises a common extrusion die apparatus.

29. Apparatus for controlled extrusion of plastic bag making film with a male zipper profile thereon and an adjacent alignment rib, comprising:
   means for extruding plastic extrudate in a predetermined volume into a film;
   means for extruding plastic extrudate into a male zipper profile having a base which joins the freshly extruded film;
   means for extruding plastic extrudate into at least one alignment rib and for joining a base of said freshly extruded rib with the freshly extruded film in adjacent spaced parallel relation to said profile; and
   means for providing a separately extruded stabilizing beam effect ridge along the back of said profile base on the opposite side of said film from the side to which said profile has been joined.

30. Apparatus according to claim 29, including means for providing a stabilizing ridge along said base of said rib on the opposite side of said film from the side to which said rib has been joined.

31. Apparatus according to claim 29, including means for providing another alignment rib with a base joined to said web parallel to said profile on the opposite side from said first mentioned rib, and means for providing a stabilizing ridge along the base of each of said ribs on the side of said film opposite to the side to which said ribs are joined.

32. A method of making plastic bag making film with a male zipper profile thereon and an adjacent alignment rib, comprising:
   providing plastic extruded film;
   providing plastic extruded male zipper profile having a base and joining the profile base into union with the film;
   providing at least one extruded plastic alignment rib, and joining a base of said rib with the film in adjacent spaced parallel relation to said male profile; and
   providing an extruded stabilizing beam effect ridge along the back of said male profile base and joining this ridge on the opposite side of said film from that to which said male profile base is joined.

33. A method according to claim 32, comprising also providing an extruded plastic stabilizing ridge along the back of said alignment rib and to the opposite side of said film from that to which said rib is joined, with said ridges blending with hinging effect between said ridges.

34. A method according to claim 33, which comprises forming both of said ridges of generally curvate cross sectional shape.

35. A method according to claim 33, which comprises forming said beam effect ridge of greater mass than the ridge back of said rib.

36. Apparatus for making plastic bag making film with a male zipper profile thereon and an adjacent alignment rib, comprising:
   means for providing plastic extruded film;
   means for providing plastic extruded male zipper profile having a base and for joining the profile base into unition with the film;
   means for providing at least one extruded plastic alignment rib and for joining a base of said rib with the film in adjacent space parallel relation to said profile; and
   means for providing an extruded stabilizing beam effect ridge in back of said profile base and for joining this ridge on the opposite side of said film from that to which said profile base is joined.

37. Apparatus according to claim 36, comprising means for also providing an extruded plastic stabilizing ridge in back of said rib and for joining this ridge on the side of said film opposite to that to which the rib is joined and with said ridges blending with a hinging effect between the ridges.

38. Apparatus according to claim 37, wherein said means for providing said ridges provides both of said ridges of generally curvate cross sectional shape.

39. Apparatus according to claim 37, wherein said means for providing said ridges provides said beam effect ridge of greater mass than the ridge back of said rib.

* * * * *